Aug. 3, 1943.          C. M. O'LEARY, JR                 2,325,874
                         PUMPING GEAR UNIT
                       Filed July 14, 1941           2 Sheets-Sheet 2
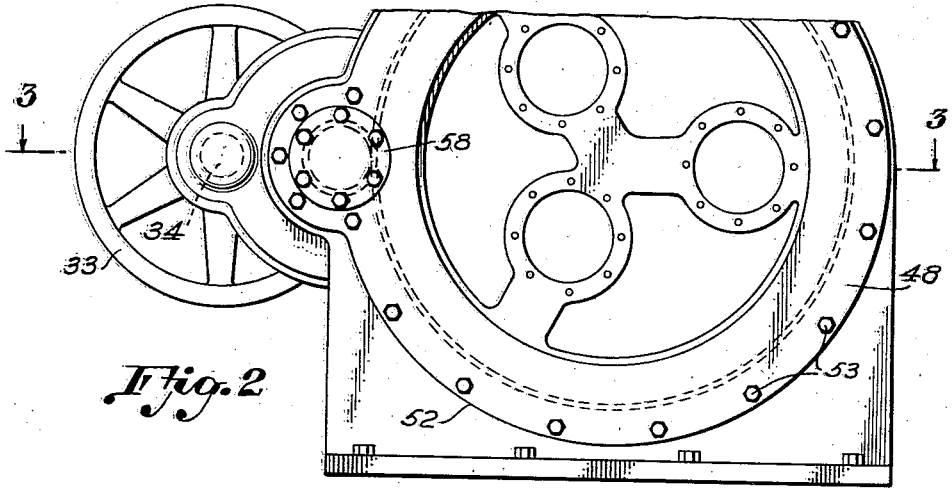
Fig. 2
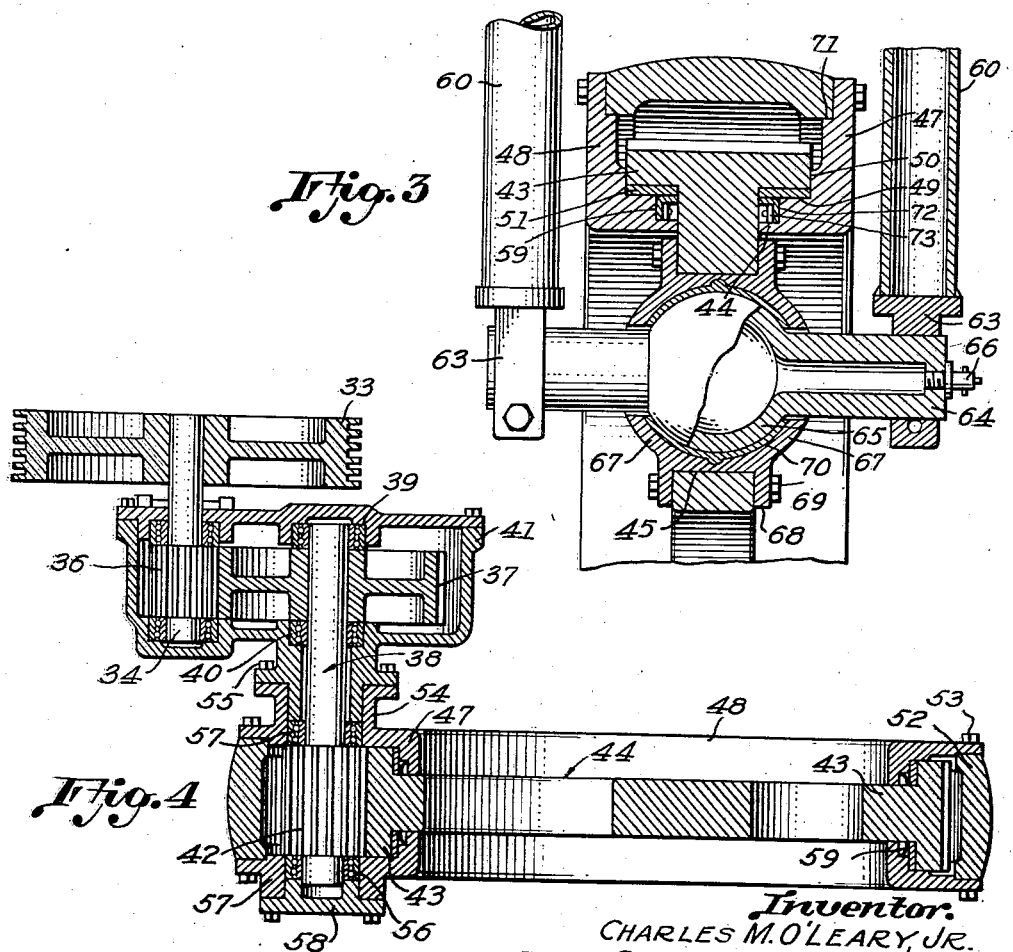
Fig. 3
Fig. 4
Inventor:
CHARLES M. O'LEARY, JR.
By James M. Abbett
Attorney.

Patented Aug. 3, 1943

2,325,874

UNITED STATES PATENT OFFICE 2,325,874

PUMPING GEAR UNIT

Charles M. O'Leary, Jr., Los Angeles, Calif.

Application July 14, 1941, Serial No. 402,325

6 Claims. (Cl. 74—414)

This invention relates to mechanical driving means and particularly pertains to a pumping gear unit.

In the operation of oil well pumping equipment it is usual practice to provide a walking beam which is driven through a pitman rod from a continuously rotating driving source. Such equipment is shown in my patent entitled "Oil well pump and counterbalance," No. 2,244,428, issued on June 3, 1941. In this type of apparatus a variable load is imposed upon the driving source due to the fact that on the up-stroke of the pump the weight of the pumping rods and a column of oil is elevated, while on the down-stroke the weight of the pumping rods is added to the driving force. It is therefore necessary to attempt to counterbalance the prevailing weights on the down-stroke and up-stroke so that a constant load is imposed upon the driving source. In actual practice, however, it is evident that as the rotation of a driving member reaches the top of the pump stroke and as it reaches the bottom of the pump stroke the crank arm connected to a pitman rod will pass over center and an excessive load will be imposed upon the driving members. This is particularly true in cases where a set of driving gears is interposed between the driving source and the pitman rod for at the extremes of the stroke these members will be placed under excessive strain, and it is desirable to mount the driving gears in a manner to insure that they will be supported to resist strain and thus to eliminate wear as the driving mechanism proceeds through a cycle of its operation. It is the principal object of the present invention, therefore, to provide a bearing support for the driving gears interposed between a driving source and an oscillating pump mechanism, and whereby maximum strain and wear will be eliminated from the parts.

The present invention contemplates the provision of a gear unit for pumping mechanism and the like, which comprises a driving pinion, a relatively large ring gear driven thereby and carrying a pitman rod connection, the ring gear being mounted for rotation upon an internal tubular bearing.

The invention is illustrated by way of example in the accompanying drawings, in which:

Fig. 2 is an enlarged fragmentary view showing the details of the gear unit.

Fig. 3 is a view in horizontal section through the gear unit as seen on the line 3—3 of Fig. 2.

Fig. 4 is an enlarged section through the crank and pitman rod structure, as seen on the line 4—4 of Fig. 1.

Figure 1:
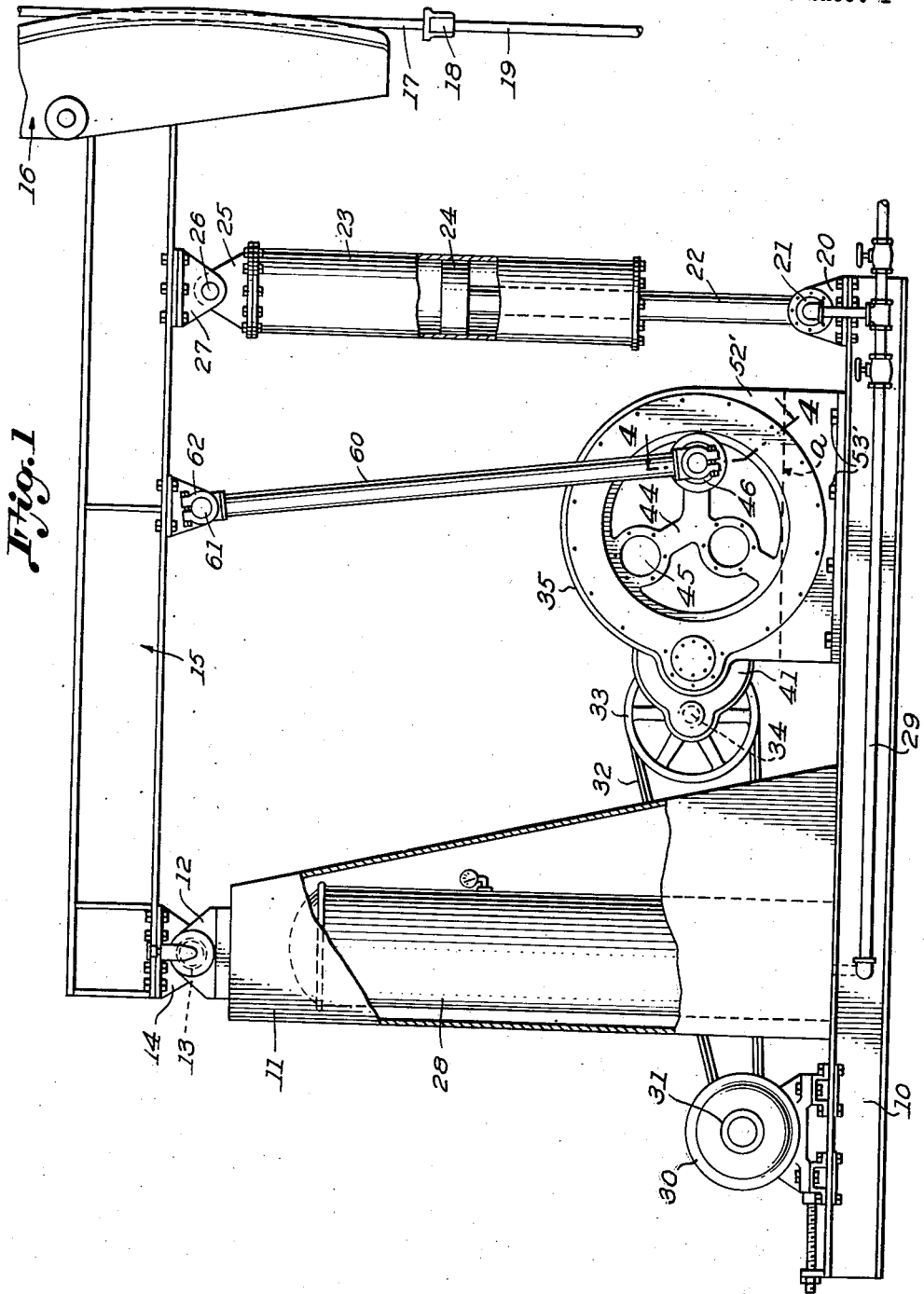
Figure 1 is a view in side elevation showing the application of the present invention to a counterbalance pumping mechanism.

Referring more particularly to the drawings, 10 indicates the base structure of a pumping unit. The base structure may be mounted upon or form a part of a well derrick floor. Mounted upon the base 10 is a Samson post 11 carrying a bearing 12. A pivot pin 13 extends through the bearing member 12 as well as a bearing 14. The bearing 14 is carried by a walking beam 15. This beam is of the cantilever type and is fitted at its outer end with a suitable horsehead 16. The reins 17 of a crosshead 18 are secured to the horsehead and are attached to the usual pumping rods 19. In the present instance a counterbalance structure is shown. This includes a pivotal bearing 20 secured upon the base 10 and carrying a tubular pivot pin 21. The tubular pivot pin 21 connects with a tubular piston rod 22 extending upwardly into a counterbalance cylinder 23. A piston 24 is carried on the piston rod and reciprocates therewith within the cylinder. Mounted on the upper end of the piston is a bearing bracket 25 carrying a pivot pin 26. This pin is also mounted in a bearing bracket 27 carried upon the lower face of the walking beam 15 adjacent to its free end.

A suitable compression tank 28 is mounted on the base 10 and communicates with the tubular pivot shaft 21 through a pipe 29. The walking beam is oscillated by the power delivered from a motor 30 or other power generating unit. As here shown, this motor is fastened upon the base 10 and drives a pulley 31 around which a belt 32 is led. The opposite end of this belt is led over a relatively large pulley wheel 33 carried on a jack shaft 34. The jack shaft is part of the gear unit generally indicated at 35 and which unit is the specific subject of the present invention. As seen in Fig. 3 of the drawings the pulley 33 drives a pinion 36. This pinion is in mesh with a gear 37 mounted upon a gear shaft 38. The gear shaft 38 is rotatably supported in bearings 39 and 40 of a housing 41. The housing 41 is carried on the housing of the gear unit 35 and includes additional parts to be hereinafter described. The shaft 38 extends from the side of the housing 41 and carries a pinion 42 on its outer extending portion. The pinion 42 is in mesh with a ring gear 43 and which gear is formed with a central spider 44 provided with a series of radial arms each having a seat 45 to receive a crank throw unit 46. The seats 45 are separately spaced a different radial distance from the axis of rotation of the ring gear so that a different length of crank arm may be obtained or a different degree of crank throw with relation to the operating cycle of the pumping mechanism.

By reference to Fig. 3 of the drawing it will be seen that the central spider 44 is relatively narrow as compared with the width of the ring gear 43. This makes it possible to mount the ring gear upon complementary fixed tubular bearings 47 and 48 and eliminates any side draft and overhanging load. These bearings are in the shape of complementary ring units each having a cylindrical bearing face 49 and a side face 50. Resting upon the bearing face 49 is a tubular cylindrical bushing 51. These bushings are of a width equal to the distance of the overhanging part of the gear 43 with relation to the spider 44 and abut against the side faces of the spider and the side face 50.

A housing element 52 extends between the members 47 and 48 and secures these members in spaced fixed relation to each other when engaged by cap screws 53. The tubular bearings 47 and 48 are counterbored to register at 71 in the housing 52 to relieve any strain on bolts 53 and add to the rigidity of the unit. Downward extensions 52' rest upon the base structure 10 and are secured in place by cap screws 53'. The member 47 also has a tubular extension 54 into which the shaft 38 projects, and which is secured to the end of the bearing 40 by bolts 55. The member 48 is formed with a tubular extension 56 which projects outwardly and receives the outer end of the shaft 38. Suitable antifriction bearings 57 are disposed upon opposite sides of the gear 42 upon the shaft 38. A closure plate 58 is secured over the end of the tubular bearing extension 56 and thus cooperates in preventing oil leakage from around the shaft. In each of the tubular shafts 47 and 48 an oil seal groove 59 is provided.

A feature of the invention having particular importance is the crank throw to which the pitman rod is connected. The pitman rod, as indicated at 60 in Fig. 1 of the drawings, extends from the crank throw structure 46 to a pitman rod shaft 61 carried by a bracket 62 on the walking beam 15. The pitman rod, as shown in Fig. 4 of the drawings, comprises two parallel rods 60 which are fitted at their lower end with clamps 63. These clamps receive the ends of a tubular crank shaft 64 which is formed intermediate its ends with a spherical portion 65. A lubricant may be introduced into the interior of the tubular shaft 64 through a suitable connection 66. The spherical portion 65 of the crank shaft 64 is secured within a pair of complementary cups 67. These cups embrace opposite sides of the spherical portion 65 of the shaft and are formed to fit within the openings 45 of the gear spider 44. Flanges 68 carried by the cups lie against opposite sides of the spider 44 and are secured in place by bolts 69. Interposed between the spherical surfaces of the portion 65 and complementary spherical segments of the cups 67 is a suitable bearing material 70. This material may be any desired substance having antifriction qualities, such as babbitt or the like. It will be evident that due to the fact that the shaft 64 has a spherical center section, and that pitman rods 60 engage opposite ends of the shaft 64 upon opposite sides of the ring gear, any misalignment in various parts will be taken care of, since the shaft 64 can oscillate in its bearing, relieving strain on the gear housing and resulting in a drive to the center plane of the gear housing.

In operation of the present gear unit the structure is assembled as here shown and the crank throw shaft 64 is assembled within the bearing cups 67 and within an appropriate seat 45 of the gear spider 44. When the structure is thus assembled driving motion is imparted through the belt 32 to the pulley 33 and then through the shaft 34 to the shaft 38. It is to be understood that while this particular type of power transmission has been disclosed that the invention is in no wise limited to this arrangement, but is more particularly concerned with the support for the ring gear 43 and the automatic adjustment of the crank throw shaft 64 with relation to the gear and the pitman rods 60.

When the shaft 38 is driven it will impart rotation to the ring gear 43 through the pinion 42. Attention is directed to the fact that the tubular bearing units 47 and 48 support the ring gear along the internal face thereof. Thus, as the ring gear imparts motion to the pitman rod 60 the tubular bearings 47 and 48 will provide the ring gear with a firm bearing support. This is particularly important at the ends of the stroke of the pitman rod, both when the rod passes over center above the rotating axis of the gear 43 and below the rotating axis. When the crank throw shaft 64 passes over dead center above the rotating axis of the gear it will be evident that there will be a force tending to pull the pitman rods downwardly and to deflect the ring gear 43 in a downwardly direction. This cannot take place in the present instance due to the fact that the tubular bearing sections 47 and 48 occur beneath the upper segment of the gear 43 which tends to deflect and will support this section and prevent deflection. When the crank throw shaft 64 passes dead center beneath the axis of the gear 43 there would tend to be a deflection of the gear downwardly but in so doing there would be a tendency for the inner face of the gear 43 to draw against the supporting surfaces of the tubular bearings at each side of the area under strain. This will brace these sections and prevent the deflection of the gear and will thus insure that the gear does not excessively wear on its bearing surface, and that the tubular bearing sections 47 and 48 are maintained in a true cylindrical shape.

It is to be understood that lubrication of the gear is brought about due to the fact that the teeth of the gear 43 pass through a body of oil standing in the lower part of the structure 52, and that the oil will be sealed within the device. This is further sealed by oil seal elements 72 and 73 which are positioned within the grooves 59. The oil level line is indicated at $a$ in Fig. 1 of the drawings.

From the foregoing analysis it will be evident that a gear unit is provided which eliminates all unnecessary strain and wear and any binding action of the parts, and also insures that a gear of relatively light weight may be used due to the fact that it is supported firmly by the bearing sections 47 and 48. The present structure, therefore, provides an efficient driving unit of light weight and great strength, which is not subjected to extensive strain, and thus insures a minimum amount of wear.

Attention is called to the further fact that by the arrangement of the present gear drive it is possible to eliminate the disadvantages obtained by the rotation of the ordinary crank and crank shaft at slow speed, and that the gear unit will be compact and of light weight and will readily lend itself to installations which balance the movement of the pump by an air counterbalance.

While I have shown the preferred form of my invention as now known to me, it will be understood that various changes may be made in combination, construction and arrangement of parts by those skilled in the art without departing from the spirit of my invention as claimed.

Having thus described my invention, what I claim and desire to secure by Letters Patent is:

1. A gear unit, including a drive shaft, a fixed bearing within which said shaft is rotatably supported, a drive gear on the shaft, a ring-shaped driven gear in mesh with the drive gear, a central web for the driven gear, a driven element carried by the central web, a pair of fixed tubular bearings extending into the central opening of the driven gear and providing an annular bearing support therefor, said bearings having outer side flanges engaging the circumferential inner face of the driven gear at opposite sides of the web, whereby the driven element may be free to move with the driven gear as guided between said side flanges, and an outer annular enclosing wall cooperating with the bearing of the drive gear and the tubular bearings of the driven gear for forming a gear case.

2. A gear unit, including a drive shaft, a fixed bearing within which said shaft is rotatably supported, a drive gear on the shaft, a ring-shaped driven gear in mesh with the drive gear, a central web for the driven gear, a driven element carried by the central web, a pair of fixed tubular bearings extending into the central opening of the driven gear and providing an annular bearing support therefor, said bearings having outer side flanges engaging the circumferential inner face of the driven gear at opposite sides of the web, whereby the driven element may be free to move with the driven gear as guided between said side flanges, an outer annular enclosing wall cooperating with the bearing of the drive gear and the tubular bearings of the driven gear for forming a gear case, and oil sealing means between the driven gear and the tubular bearings for confining a lubricant within the gear case.

3. A gear unit, comprising a gear case forming an annular raceway disposed in a vertical plane and having a central circular opening therethrough defined by complementary annular wall sections spaced from each other at opposite sides of the central vertical plane of the case, an annular bearing surface carried by each of said walls and spaced from each other along the central plane of the structure to form a slotted opening, a ring gear mounted within the case and supported upon said bearing surfaces, whereby it may move therearound, a driving connection secured to the inner circumferential face of the ring gear and projecting through the slotted opening formed between the annular walls, a driving pinion in mesh with the ring gear, a shaft carrying the same, and a fixed bearing secured to the case and within which said shaft is rotatably supported.

4. A gear unit, comprising a gear housing including a pair of spaced side walls, an outer wall connecting said spaced side walls and cooperating therewith to form an enclosure, a pair of annular inner walls connecting with the side walls and defining a central annular passageway through the housing, said annular inner walls being spaced from each other horizontally, whereby an annular passage will be formed between the annular inner walls, an annular bearing surface carried upon the outer circumference of each of said annular inner walls, a ring gear mounted within the gear housing upon said annular bearing surfaces and spanning the space therebetween, a driving pinion in mesh with the ring gear, a shaft therefor, and a bearing for said shaft carried by said gear housing.

5. The structure of claim 4 including a driving member carried by the ring gear and projecting through the annular space between the inner walls of the housing, whereby the ring gear may rotate upon its axis while imparting movement to the driving connection.

6. The structure of claim 4 including a driving member carried by the ring gear and projecting through the annular space between the inner walls of the housing, whereby the ring gear may rotate upon its axis while imparting movement to the driving connection, and a transversely disposed crank pin carried by said driving connection and projecting at opposite sides of the gear housing.

CHARLES M. O'LEARY, Jr.